US007633922B2

(12) United States Patent
Kotulla et al.

(10) Patent No.: US 7,633,922 B2
(45) Date of Patent: Dec. 15, 2009

(54) METHOD AND SYSTEM FOR SUPPORTING SERVICE CONTINUITY FOR MOBILE COMMUNICATION OVER DIFFERENT ACCESS NETWORKS

(75) Inventors: Andreas Kotulla, Sankt Augustin (DE); Alexander Schaub, Königswinter (DE)

(73) Assignee: T-Mobile International AG & Co. KG, Bonn (DE)

( * ) Notice: Subject to any disclaimer, the term of this patent is extended or adjusted under 35 U.S.C. 154(b) by 403 days.

(21) Appl. No.: 11/753,401

(22) Filed: May 24, 2007

(65) Prior Publication Data

US 2008/0130662 A1 Jun. 5, 2008

Related U.S. Application Data

(63) Continuation-in-part of application No. PCT/DE2005/002117, filed on Nov. 24, 2005.

(30) Foreign Application Priority Data

Nov. 26, 2004 (DE) ........................ 10 2004 057 311

(51) Int. Cl.
*H04Q 7/24* (2006.01)
*H04L 12/66* (2006.01)
*H04L 12/28* (2006.01)
(52) U.S. Cl. ........................ 370/338; 370/352; 370/401
(58) Field of Classification Search ................. 370/338, 370/352, 401
See application file for complete search history.

(56) References Cited

U.S. PATENT DOCUMENTS

| | | | | |
|---|---|---|---|---|
| 7,251,227 | B2 * | 7/2007 | de Jong et al. | 370/331 |
| 7,293,107 | B1 * | 11/2007 | Hanson et al. | 709/245 |
| 7,295,119 | B2 * | 11/2007 | Rappaport et al. | 340/572.4 |
| 7,305,229 | B2 * | 12/2007 | Fox et al. | 455/406 |
| 7,339,928 | B2 * | 3/2008 | Choyi et al. | 370/390 |
| 2003/0095523 | A1 * | 5/2003 | Korus et al. | 370/338 |
| 2004/0266435 | A1 * | 12/2004 | de Jong et al. | 455/436 |
| 2005/0213545 | A1 * | 9/2005 | Choyi et al. | 370/338 |
| 2006/0252438 | A1 * | 11/2006 | Ansamaa et al. | 455/503 |
| 2006/0268840 | A1 * | 11/2006 | Xu et al. | 370/352 |
| 2007/0070957 | A1 * | 3/2007 | Schwartz | 370/335 |
| 2007/0097917 | A1 * | 5/2007 | Kang | 370/331 |
| 2009/0196234 | A1 * | 8/2009 | Greene et al. | 370/328 |

* cited by examiner

*Primary Examiner*—Andrew Lee
(74) *Attorney, Agent, or Firm*—The Maxham Firm

(57) ABSTRACT

A method and system for switching between at least two different access network technologies in a mobile terminal during a packet-oriented data traffic to a destination network without interrupting an active network application or a service. An access control application is installed in the terminal. The access control application determines access networks to the destination network, which are available at the location of the terminal, monitors their availability and, while taking preset criteria into account, routes the data traffic over the respectively available access network to an access control application of the destination network and vice versa.

19 Claims, 1 Drawing Sheet

METHOD AND SYSTEM FOR SUPPORTING SERVICE CONTINUITY FOR MOBILE COMMUNICATION OVER DIFFERENT ACCESS NETWORKS

CROSS REFERENCE TO RELATED APPLICATION

This application is a Continuation-in-Part of International Application No. PCT/DE2005/002117, filed on 24 Nov. 2005, entitled "Method and System for Supporting Service Continuity for Mobile Communication Over Different Access Networks."

FIELD OF THE INVENTION

The invention relates generally to a method and system for supporting service continuity for mobile communication over different access networks, and in particular to a method and system for switching between at least two different access network technologies in a mobile terminal for packet-oriented data traffic to a destination address of a destination network without interrupting an active network application or a service.

DISCUSSION OF PRIOR ART

In the mobile communication sector there are various access technologies such as WLAN, UMTS, and GPRS access networks, for example, for packet-oriented data networks such as the Internet. Current mobile terminals and networks are not able to change the access technology during an active connection to the data network. Therefore, services or applications which are active over, for example, a first access technology such as a WLAN network cannot be converted interruption-free to a simultaneously available second access technology such as a UMTS network when the transport path for the first access network is interrupted during the application.

For mobile Internet use (IP application), an existing data connection of applications on the mobile terminal should not be interrupted, even when the user changes his location in the network. Conversely, all changes to connections and interfaces, for example, during a change between different access networks (mobile wireless network, WLAN, Bluetooth, etc.), should occur automatically so that the user preferably is not aware of same. If a user desires to change, for example, between two different access networks while an IP application is being carried out, at the moment that the user leaves the service area for the old access network the IP connection is interrupted until a connection to a new available access network has been established. Advantageously, at any location the user would prefer to be automatically connected to the most economical or strongest of all the available mobile access networks without having to deal with time-consuming selection procedures.

As an example, a mobile subscriber is located in the service area of a WLAN hot spot and has an active Internet connection. At the same time he is in a UMTS service area. The subscriber begins, for example, a voice over IP (VoIP) telephone conversation which, because of the higher data rate and the lower cost, is processed over a WLAN transport path. During the conversation the subscriber moves from the WLAN hot spot until the coverage is too low to maintain the service, and the connection is terminated. Ideally, however, the conversation should not be ended, but instead should be switched in an unnoticed manner to another available transport path, that is, UMTS.

Approaches exist which address this problem. However, these solutions are based on a complicated and costly adaptation or supplementation of the infrastructures of the network technologies involved, for example, WLAN, 2G, or 3G. Referenced by way of example is the publication EP 1 271 893 A2 by Swisscom Mobile AG and UMA.

US patent publication 2002/059434 A1 discloses a method for switching between at least two different access network technologies for a mobile terminal during a packet-oriented data connection to a destination address of a destination network in which access networks that are available to the destination network at the location of the terminal are determined by an access control application installed in the terminal. This process takes into account the connection costs, transmission speed, or quality of service, where the connection is routed via the respective available access network to the desired destination address, and vice versa. In the OSI layer model, this approach is based on layer 2 (link layer) or layer 3 (network layer), which requires special terminals or modifications to the hardware and/or software for the terminals/clients.

US patent publications 2003/100308 A1 and US 2002/122394 A1 disclose similar methods, likewise based on intervention in the OSI layers 2 and 3.

SUMMARY OF THE INVENTION

A purpose of the present invention is to provide a method and a system of the aforementioned type by means of which a mobile terminal may be switched from one access network to another without interrupting an active application, with only slight changes to the terminal and the communication network.

A method according to an embodiment of the invention allows interruption-free IP services during a change of the access network, and thus allows service continuity without having to adapt or supplement portions of the (core) network.

The system of the invention functions with any change of the access technology being used, for example UMTS, WLAN, GPRS, Bluetooth, among others, and also over multiple radio cells or service areas for the same access technology.

The approach is essentially based on novel access control applications in the form of software components, of which a first is installed on the terminal in the form of a proxy A, and a second is installed in the destination network in the form of a proxy B.

Previous methods for interruption-free mobility between WLAN and GPRS/UMTS require extensive and costly changes to the network infrastructure. The proposed approach requires only appropriate proxy software on the mobile terminal and in a network element (server) of the destination network. For the user, this allows "roaming" between different access networks without having to interrupt existing applications or communication services.

Thus, VoIP conversations may be carried out in a WLAN hot spot, for example. When the user leaves the hot spot the conversation is automatically relayed over another available access network such as UMTS, for example.

Of course, this does not apply to VoIP services, but does likewise apply to all other IP applications or wireless application protocol (WAP) applications.

Access control applications proxy A and proxy B are understood as software applications that are switched between the terminal applications and the Internet server applications, and vice versa. Any communication between an application on a terminal and a packet-oriented data service is processed via proxies A and B which, unnoticed by the application or service being carried out on the terminal, use the particular available or favorable transport path for exchanging data packets between the terminal and the Internet application.

Proxy A, which is installed on the customer's mobile terminal, is used in particular for monitoring, tracking, and retaining the available transport paths, that is, the available access networks for packet-oriented IP traffic. When the terminal is equipped for using both WLAN and UMTS, proxy A monitors which of the two transport paths is available at that moment and, based on criteria selectable by the user, chooses a preferred transport path.

To make use of the described service continuity, of course, the subscriber must have use authorization in all networks that are to be used. For example, an active subscriber relationship in a mobile wireless network and an access authorization in the WLAN hot spot to be used would be required.

In addition, the entire data traffic between two end points must be routed via the two described proxies A and B. The application in use, such as the web browser, VoIP client, among others, must be able to configure a proxy, or the transmission protocol in use must allow use of a transparent proxy. In other words, access queries by a terminal application are not transmitted directly to the destination address, but instead are first sent to the address of the correspondingly configured proxy (proxy A or proxy B).

The available transport path is monitored by the fact that proxy A and proxy B send messages at regular intervals concerning the available transport paths. Such messages are also referred to as "heartbeat' or "keep alive" messages. The active transport path may be adapted if a transport path fails. If proxy A detects a new possible access network, for example because the user has moved into the service area of a new WLAN hot spot, proxy A is registered, optionally automatically, in the new access network and the possible connection is noted. As a result of the continuous monitoring of the physical network interfaces and their characteristics, for example, a switch may be made, optionally automatically, if physical network interfaces become available which have better transfer options than the one that is active at that moment.

BRIEF DESCRIPTION OF THE DRAWING

One exemplary embodiment of the invention is explained with reference to the drawing FIGURE. Further features, advantages, and developments of the invention are disclosed in the following detailed description, when read in conjunction with the accompanying drawing, wherein.

DETAILED DESCRIPTION OF THE PREFERRED EMBODIMENTS

Figure 1:
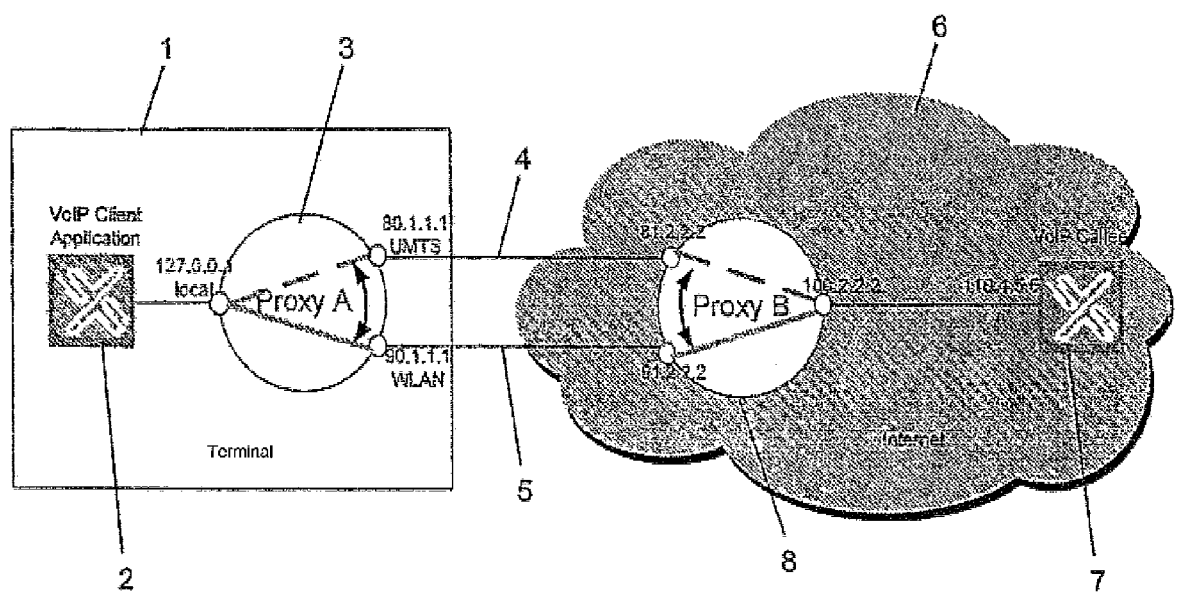
FIG. 1 schematically shows the structure and mode of operation of the method according to the invention, using as an example UMTS and WLAN access networks having two possible transport paths, and a VoIP application.

On mobile terminal 1, which may be a mobile telephone, for example, a user starts an application for making a telephone call over the Internet, also referred to as a voice over IP (VoIP) application 2. The aim is to establish an IP connection with remote location 7 connected to the Internet. Remote location 7 may be, for example, a personal computer that is connected to the Internet.

To establish the desired connection, the calling location 1 must know the network address, for example, IP address 110.4.5.6, of the remote location being called. Location 1 also needs an IP address in the network being used; in FIG. 1 this is either the address 80.1.1.1 in the UMTS network or 90.1.1.1 in the WLAN network.

If the two IP addresses are known, a conventional IP connection may be established between locations 1, 7 via the Internet. To this end, mobile terminal 1 can use a WLAN access network which is available at the site. However, if the terminal moves from the coverage area of this WLAN network, this would inevitably result in an interruption of such a conventional connection.

Such an interruption of the IP connection may be avoided by means of the present invention.

To this end, access control applications 3, 8 in the form of proxy applications (proxy A and proxy B) are installed in both mobile terminal 1 and in a network node of Internet 6. Any IP traffic between locations 1 and 7 is routed via proxies 3 and 8.

The request by terminal 1 to connect with the remote location based on the destination address 110.4.5.6 is first routed to proxy A. Proxy A determines which access networks to Internet 6 are available at that moment for the user's terminal 1. In the present example a UMTS access network 4 and a WLAN access network 5 are available. Based on the user's preference settings (for example, to select the most economical connections), proxy A chooses, for example, WLAN access network 5 and makes a connection with the network-side proxy B, using the proxy B network address 91.2.2.2 in the WLAN access network. From proxy B the connection to the destination address 110.4.5.6 of the receiver may then be established on the Internet.

The corresponding proxy addresses are negotiated between the two proxies 3 and 8.

Conversely, the remote location 7 may respond to proxy B via the Internet based on its IP address 100.2.2.2. Proxy B reaches proxy A via the WLAN network 5 at the address 90.1.1.1, and proxy A can then establish the connection to the original address 127.0.0.01.

If a connection via WLAN network 5 is no longer possible or is interrupted for any reason, proxy A switches, unnoticed and without interruption, the running IP application to UMTS access network 4 if it is available. Via UMTS access network 4 proxy A can respond to proxy B at the address 81.2.2.2, and conversely, proxy B reaches proxy A at the address 80.1.1.1. There is still a connection to the requested destination address 110.4.5.6 via the internet address 100.2.2.2 of proxy B.

This description is an example only and the person of ordinary skill in this technical field will likely develop alternatives which are equivalent to the specific example set forth. The invention is not to be limited by the example described and should be limited only by the scope of the appended claims and their reasonable equivalents.

What is claimed is:

1. A method for switching between at least two different access network technologies in a mobile terminal during a packet-oriented data connection to a destination address of a destination network without interrupting an active network application or a service, the method comprising:

determining the access networks that are available to the destination network at the location of the mobile terminal by a terminal access control application installed in the mobile terminal, taking into account specified criteria;

routing the connection to the desired destination address via the respective available access network, and vice versa, the connection being routed via a destination access control application for the destination network;

the terminal and destination access control applications:

continuously monitor the availability of the access networks, and continuously exchange information with one another concerning the availability of the access networks that are present automatically and without interrupting an active network application or a service switch as needed between the available access networks.

2. The method according to claim 1, wherein the terminal and destination access control applications, respectively, are operated as proxy software applications on the mobile terminal and on a network element of the destination network.

3. The method according to claim 1, wherein the specified criteria that are configurable by the user with regard to the available access networks are selected from the group consisting of connection costs, access authorizations, technical capabilities of the terminal used, security aspects, transmission speed, and network coverage.

4. The method according to claim 2, wherein the specified criteria that are configurable by the user with regard to the available access networks are selected from the group consisting of connection costs, access authorizations, technical capabilities of the terminal used, security aspects, transmission speed, and network coverage.

5. The method according to claim 1, and further comprising:

converting a network address in the destination network requested by the mobile terminal to an address for the terminal access control application, the network addresses for the destination access control application being present for each available access network; and routing the connection to the network address in the destination network via these network addresses for the destination access control application.

6. The method according to claim 2, and further comprising:

converting a network address in the destination network requested by the mobile terminal to an address for the terminal access control application, the network addresses for the destination access control application being present for each available access network; and routing the connection to the network address in the destination network via these network addresses for the destination access control application.

7. The method according to claim 3, and further comprising:

converting a network address in the destination network requested by the mobile terminal to an address for the terminal access control application, the network addresses for the destination access control application being present for each available access network; and routing the connection to the network address in the destination network via these network addresses for the destination access control application.

8. The method according to claim 4, and further comprising:

converting a network address in the destination network requested by the mobile terminal to an address for the terminal access control application, the network addresses for the destination access control application being present for each available access network; and routing the connection to the network address in the destination network via these network addresses for the destination access control application.

9. The method according to claim 1, and further comprising:

converting an address for the mobile terminal requested by the destination network to a network address for the access control application, the network addresses for the terminal access control application being present for each available access network; and routing the connection to the network address in the destination network via these network addresses for the destination access control application.

10. The method according to claim 2, and further comprising:

converting an address for the mobile terminal requested by the destination network to a network address for the access control application, the network addresses for the terminal access control application being present for each available access network; and routing the connection to the network address in the destination network via these network addresses for the destination access control application.

11. The method according to claim 3, and further comprising:

converting an address for the mobile terminal requested by the destination network to a network address for the access control application, the network addresses for the terminal access control application being present for each available access network; and routing the connection to the network address in the destination network via these network addresses for the destination access control application.

12. The method according to claim 4, and further comprising:

converting an address for the mobile terminal requested by the destination network to a network address for the access control application, the network addresses for the terminal access control application being present for each available access network; and routing the connection to the network address in the destination network via these network addresses for the destination access control application.

13. The method according to claim 5, and further comprising:

converting an address for the mobile terminal requested by the destination network to a network address for the access control application, the network addresses for the terminal access control application being present for each available access network; and routing the connection to the network address in the destination network via these network addresses for the destination access control application.

14. The method according to claim 1, wherein the terminal and destination access control applications continuously exchange information with one another concerning their IP addresses which are valid in the respective access networks.

15. The method according to claim 2, wherein the terminal and destination access control applications continuously exchange information with one another concerning their IP addresses which are valid in the respective access networks.

16. The method according to claim 3, wherein the terminal and destination access control applications continuously exchange information with one another concerning their IP addresses which are valid in the respective access networks.

17. The method according to claim 5, wherein the terminal and destination access control applications continuously exchange information with one another concerning their IP addresses which are valid in the respective access networks.

18. The method according to claim 9, wherein the terminal and destination access control applications continuously exchange information with one another concerning their IP addresses which are valid in the respective access networks.

19. A system for switching between at least two different access network technologies in a mobile terminal during a packet-oriented data connection to a destination address in a destination network without interrupting an active network application or a service, the system comprising:

a terminal access control application installed in the terminal which functions to determine the available access networks for the destination network at the location of the terminal, to monitor the availability thereof and, taking into account specified criteria, route the data connection to the destination address via the respective available access network, and vice versa; and a destination access control application in the destination network, the terminal and destination access control applications having means to continuously monitor the availability of the access networks to automatically exchange information with one another concerning the availability of the access networks that are present, and to automatically switch between the available access networks without interrupting an active network application or a service.

\* \* \* \* \*